United States Patent [19]

Graetzel et al.

[11] 4,427,749

[45] Jan. 24, 1984

[54] PRODUCT INTENDED TO BE USED AS A PHOTOCATALYST, METHOD FOR THE PREPARATION OF SUCH PRODUCT AND UTILIZATION OF SUCH PRODUCT

[75] Inventors: Michael Graetzel, c/o Ecole Polytechnique Federale Lausanne 33, avenue de Cour, CH-1015 Lausanne, Switzerland; Kuppuswamy Kalyanasundaram, Chavannes, Switzerland; Dung Duonghong; Michael Neumann-Spallart, both of Lausanne, Switzerland; Enrico Borgarello, Echandens, Switzerland

[73] Assignee: Michael Graetzel, La Conversion, Switzerland

[21] Appl. No.: 343,177

[22] Filed: Jan. 27, 1982

[30] Foreign Application Priority Data

Feb. 2, 1981 [CH] Switzerland .................. 667/81

[51] Int. Cl.³ .................. H01M 6/36; C25B 1/00; C25B 1/02
[52] U.S. Cl. .................. 429/111; 204/72; 204/75; 204/77; 204/114; 204/128; 204/129; 204/242; 204/257; 204/278; 204/DIG. 3; 427/74
[58] Field of Search .............. 204/72, 75, 77, 114, 204/128, 129, 290 R, 290 F, 242, 257, 278, DIG. 3; 429/111; 427/74

[56] References Cited

U.S. PATENT DOCUMENTS 4,094,751 6/1978 Nozik .................. 204/80
4,128,704 12/1978 McKinzie et al. .................. 429/111
4,182,796 1/1980 Heller .................. 429/111
4,219,392 8/1980 Halmann .................. 204/72
4,236,984 12/1980 Grantham .................. 204/129

OTHER PUBLICATIONS

Chem. Abstr., vol. 94, 93504w (1981).
S. Gourgaud et al., "Semiconductor/Electrolyte Photoelectric Energy Conversion: The Use of a Molybdenum Oxide Coating to Avoid Corrosion", *J. Electrochem. Soc.*, vol. 124, pp. 102-107 (1977).
T. Kawai et al., "Conversion of Carbohydrate into Hydrogen by a Photocatalytic Process", *Nature*, vol. 286, pp. 474-476 (Jul. 1980).
M. Grätzel, "Photochemical Methods for the Conversion of Light into Chemical Energy", *Ber. Bunsenges Phys. Chem.*, vol. 84, pp. 981-991 (1980).

*Primary Examiner*—Aaron Weisstuch
*Attorney, Agent, or Firm*—Stevens, Davis, Miller & Mosher

[57] ABSTRACT

The product is in the form of discrete particles or in the form of a layer comprising an electrode. It consists of a semi-conductor material subject to photo-corrosion, for example, cadmium sulphide. In order to prevent such photo-corrosion, the surface of the semi-conductor material, which is intended to be illuminated, is covered with a transparent layer of $RuO_2$, $IrO_2$ or a mixture of $RuO_2$ and $IrO_2$.

The product may be used for the conversion of solar energy into electric energy or into a fuel such as hydrogen.

21 Claims, 1 Drawing Figure

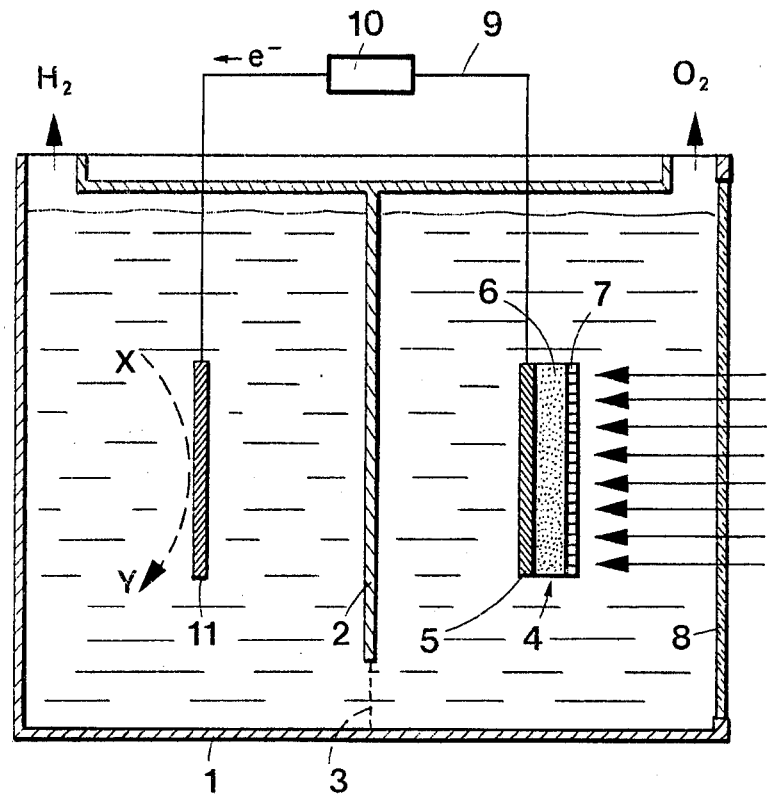

PRODUCT INTENDED TO BE USED AS A PHOTOCATALYST, METHOD FOR THE PREPARATION OF SUCH PRODUCT AND UTILIZATION OF SUCH PRODUCT

The objects of the present invention are a product intended to be used as a photocatalyst, a method for the preparation of such product and the utilization of such product for generating electric power and/or generating a substance chemically transformable with release of energy, and the utilization of such product involving the exposure of the product to electromagnetic radiation.

The conversion of light into electric or chemical energy in photoelectrochemical devices provided with semi-conductor electrodes has recently given rise to much research. Materials in which the active atoms have a narrow forbidden band (i.e., the energy band separating the valence band from the conduction band), have drawn attention because of their intrinsic capacity to convert visible solar light. However, a serious problem associated with the use of those materials lies in their susceptibility to photo-corrosion. For example, with cadmium sulphide and gallium phosphide, which are n type semi-conductors, the holes ($h^+$) produced within the valence band under illumination migrate towards the surface where a photo-corrosion reaction takes place according to the following equations:

$$CdS + 2h^+ \rightarrow Cd^{2+} + S \quad (1)$$

$$3H_2O + GaP + 8h^+ \rightarrow Ga^{3+} + PO_3^- + 6H^+ \quad (2)$$

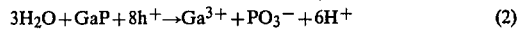

The above reactions may be prevented by the presence of appropriate reducing agents, such as ferrocyanide ions, sulphide ions, sulphite ions, or hydroquinone, which capture the holes at the semi-conductor/electrolyte interface before the dissolution of the electrode takes place. However, the transfer of the hole through the interface requires a high driving force which consumes a substantial fraction of the absorbed light energy.

The present invention is based on the discovery that a deposit of ruthenium oxide or a mixture of ruthenium oxide and iridium oxide on the surface of the semi-conductor materials subject to photo-corrosion inhibits photo-corrosion.

The inhibition of the photo-corrosion probably results from the promotion of water oxidation according to the following equation:

$$4h^+(CdS) + 2H_2O \xrightarrow{(RuO_2)} O_2 + 4H^+ \quad (3)$$

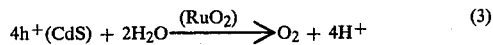

The product according to the invention, comprising a semi-conductor material intended to be used as a photocatalyst in the form of discrete particles or in the form of a layer comprising an electrode, said semi-conductor material being subject to photo-corrosion, is characterized in that the surface of the semi-conductor material which is intended to be illuminated is covered with a transparent layer of ruthenium oxide ($RuO_2$), iridium oxide ($IrO_2$), or a mixture of ruthenium oxide ($RuO_2$) and iridium oxide ($IrO_2$) which inhibits the photo-corrosion of the semi-conductor material.

It has already been proposed to deposit ruthenium oxide in association with platinum on particles of titanium dioxide (see particularly E. Borgarello et al, *Nature*, 299, 158c (1981). However, titanium dioxide is a semi-conductor which is not subject to photo-corrosion, and the function of the deposit of ruthenium oxide on the titanium dioxide is only to increase the yield of the production of hydrogen and oxygen by water photolysis.

The single FIGURE of the drawing represents diagrammatically, by way of example, a cross-section of a water photolysis cell provided with an anode, according to one embodiment of the product according to the invention, and intended for the production of hydrogen and oxygen.

This cell is delimited by a container 1 divided into two compartments by a central partition wall 2. This central partition does not reach the bottom of the container, but is extended downwards by a permeable membrane 3, which could be omitted. The right-hand side compartment contains an anode 4 having the form of a plate, which comprises a conductive support 5, made of carbon, aluminum, titanium or any other material resistant to corrosion by the liquid medium of the cell. On its side facing the outer wall 8 of the cell, the support 5 is covered with a layer 6 of a polycrystalline semi-conductor material subject to photo-corrosion, preferably a semi-conductor material which is operative as a photocatalyst in visible light, for example, cadmium sulphide (CdS), cadmium selenide (CdSe), gallium phosphide (GaP) or silicon (Si).

The exposed surface of the layer of semi-conductor material 6 is itself covered with a transparent layer 7 of ruthenium oxide ($RuO_2$), or a mixture of ruthenium oxide ($RuO_2$) and iridium oxide ($IrO_2$), in a molar proportion of 3:1. The side wall 8 of the container 1 which faces the anode is itself made of a transparent or translucent material, such as glass, in order to allow solar radiation, represented by parallel arrows, to illuminate the semi-conductor layer 6 through the transparent layer 7.

The thickness of layers 6 and 7 is exaggerated for purposes of clarity in the drawing.

The conductive support 5 of the anode 4 is electrically connected, by a conductor 9, through a resistor 10 (optional), to a cathode 11, also having the shape of a plate, the surface of which is made of a material with a low overvoltage of hydrogen reduction, for example, platinum or nickel.

The container 1 is filled with an aqueous solution buffered to an acidic pH, in a known manner. Under irradiation of anode 4, evolution of oxygen from the anodic compartment and hydrogen from the cathodic compartment of the cell is observed, at the same time that an electric current of about 5 mA/cm² of the illuminated anode surface flows through the conductor 9. The direction of flow of electrons $e^-$ is represented by an arrow. The letters X and Y represent, respectively, the substance which is to be reduced and the product of the reduction.

As is well known, the oxygen of the water is oxidized on the semi-conductor material of the anode 4 and the hydrogen of the water is reduced on the surface of the cathode 11. It is obvious that a similar cell could be used for the photolysis of ionizable compounds other than water, for example, hydrobromic acid, bromides, zinc and lead salts, etc. In all cases, the cation is reduced and the anion is oxidized. Thus, in the case of a solution of 0.1 M KBr, during the irradiation a current of about 10 mA/cm² of illuminated anode surface was observed, with release of bromine on the anode and evolution of hydrogen at the cathode. When the solution contains a carbonate, carbonic acid may be reduced at the cathode to formic acid and the latter may in turn be reduced to methanol. The presence of the layer 7 of ruthenium oxide or a mixture of ruthenium oxide and iridium oxide inhibits photo-corrosion in all these mediums and widens the possible selection of redox couples. The material of the cathode is selected in each case so as to have the minimum overvoltage for the reduction process.

In an alternative not shown, which is only intended for the production of electric power, the central wall 2 and the permeable membrane 3 are omitted so as to facilitate the diffusion of oxidation-reduction products. The produced electrical power is used in the resistor 10, which may be replaced by another useful load or by an accumulator.

The product according to the invention also may be used in the form of particles suspended in an aqueous solution, such as one of the solutions mentioned here above. In such a case, the surface of each particle is divided into an anodic site and a cathodic site. The anodic site carries a layer of ruthenium oxide or a mixture of ruthenium oxide and iridium oxide, and the cathodic site is preferably covered with a layer of platinum or another material having a low overvoltage for the reduction of the cation. During the irradiation of such a suspension, the oxidized and reduced products, for example, oxygen and hydrogen, are mixed and they may, if desired, be separated subsequently in a known manner.

In place of suspended particles, there could be immersed in the aqueous solution a plate similar to the anode of the cell represented, but in which the side opposite the one carrying the layer of semi-conductor material is coated with platinum, nickel or any other material having a low overvoltage for the reduction of the cation considered. In this case, the plate would operate both as an anode and as a cathode and, upon illumination, would produce a mixture of oxidized and reduced products, for example, bromine and hydrogen.

The examples which follow illustrate the preparation and utilization of the photocatalyst according to the invention.

EXAMPLE 1

Electrode With Polycrystalline Cadmium Sulphide 200 mg of CdS of 99.9% purity were mixed with 200 μl of a solution at 5% V/V of "Triton X-100" ("Triton" is a trademark of Rohm and Haas designating surface active agents) in water containing 20 mg of $ZnCl_2$. A suspension was obtained with which a cleaned surface of a plate of Ti was coated. The coated plate, constituting an electrode, was then heated at 620° C. for 10 minutes in a stream of argon. After cooling in argon down to room temperature, the current potential curves of the electrodes were determined. The coated surfaces of CdS was then placed in contact with an aqueous solution containing 0.1 M acetate buffer at a pH of 7 and illuminated by means of a tungsten-halogen lamp of 250 W.

An anodic photo-current was initiated at a potential more positive than −950 mV measured against an Ag-/AgCl electrode. The current for a voltage of +0.1 V (Ag/AgCl) was higher than 10 mA/cm² of electrode surface. However, this current decreases rapidly until it reaches 0, due to photo-corrosion of the CdS surface. The maximum lifetime of the electrode is 5 minutes under these conditions.

Such photo-corrosion is prevented by depositing an ultrafine layer of $RuO_2$ on the CdS surface. The following two methods have been used:

a. The CdS electrode was immersed into a solution of $RuO_4$ in water (0.5 mg/ml). $RuO_2$ was spontaneously deposited under daylight illumination according to the equation:

$$RuO_4 \rightarrow RuO_2 + O_2$$

After 2 minutes of immersion in the solution, the electrode was air-dried and then annealed at 100°–200° C. for approximately 15 minutes.

b. The CdS electrode was immersed into a 0.02 M solution of $RuCl_3$ in water. The $Ru^{3+}$ ions absorbed at the surface were then oxidized in air at 100° C. for 15 minutes to yield $RuO_2$ according to the equation:

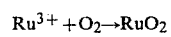
$$Ru^{3+} + O_2 \rightarrow RuO_2$$

The immersion and oxidation operations were repeated three times.

An electrode prepared according to (a) or (b) is no longer affected by the photo-corrosion according to the process

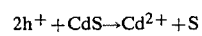
$$2h^+ + CdS \rightarrow Cd^{2+} + S$$

Instead, oxygen is evolved according to:

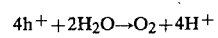
$$4h^+ + 2H_2O \rightarrow O_2 + 4H^+$$

In this example, cadmium sulphide may be replaced by cadmium selenide (which gives a potential more positive than −700 mV), by gallium phosphide or by silicon. It is also possible to replace $RuCl_3$ by $IrCl_3$ in the above method b) to form a layer of $IrO_2$.

EXAMPLE 2

Suspension of Cadmium Sulphide 25 mg of CdS of 99.999% purity were dispersed into 25 ml of water by means of ultrasonic vibrations. An aqueous solution of $RuO_4$ added and the mixture stirred for approximately 30 minutes under daylight illumination. $RuO_4$ decomposed spontaneously into ultrafine $RuO_2$, as in Example 1, and was deposited on the CdS particles. The final concentration of $RuO_2$ was 8 mg/l. Platinum was deposited on a portion of the surface of the particles by photoplatinization in a method described hereafter:

To a solution containing 25 mg of CdS coated with $RuO_2$, 3 mg of $H_2PtCl_6$ and 0.5 ml of an 0.5 M solution of formaldehyde in a 2:3 methanol/water solution were added, so as to obtain a concentration of formaldehyde of 0.01 M. After deaeration by means of nitrogen, the dispersion was illuminated for 30 minutes with a xenon lamp of 450 W through a 320 nm cut-off filter. This duration is sufficient for the quantitative reduction of the Pt ions by the electrons of the conductive band. (The holes created in the valence band are used to oxidize the formaldehyde). Then, the excess of formaldehyde, methanol and water was expelled under vacuum at 30° C. The dried power contained about 40 mg of Pt and 8 mg of $RuO_2$ per gram of CdS.

Samples of 25 ml of solutions having a pH of 6.2 and containing 25 mg of catalyst were illuminated with the light of a 450 W xenon lamp through a 400 nm cut-off filter and a water cell 15 cm thick, so as to eliminate IR and UV radiations. Through analysis of the emitted gas, a hydrogen production rate of about 0.014 ml/h was recorded after a short induction period. Also, oxygen was produced in a stoichiometric proportion. Comparative tests carried out in the same conditions but with CdS free from $RuO_2$ have shown a rapid photodegradation of CdS with formation of elemental sulphur. Other tests have shown that the yield of the photolysis increased by 50% when the proportion of $RuO_2$ on the CdS particles was doubled.

EXAMPLE 3

Colloidal Dispersion of CdS

A CdS sol was prepared in the following manner: 100 mg of maleic anhydride-styrene copolymer 50/50 (supplied by TNO, Utrecht, Netherlands) were dissolved in 100 ml of water at a pH of 10 (adjusted by means of 1 N NaOH) with stirring at 50° C. for several hours. After complete dissolution, 0.15 ml of a solution of 10% (wt/vol) of ammonium sulphide was added. Into the solution thus obtained, 10 ml of a solution of $CdSO_4$ at 2 g/l was injected very slowly (by means of a microsyringe). An intense yellow color appeared with stirring for approximately 1 hour, indicating the formation of the CdS sol. Then, the pH of the sol was adjusted to a value of 3 by means of HCl and the excess of sulphide was expelled in the form of $H_2S$ by bubbling nitrogen through the sol until the following day. The final concentration of CdS was 110 mg/l, which corresponds to $8.4 \times 10^{-4} 1 M$.

The deposit of $RuO_2$ was effected by spontaneous decomposition of $RuO_4$, as in the preceding Examples: 0.5 ml of a 0.5 mg/ml aqueous solution of $RuO_4$ was injected into 20 ml of the CdS sol with stirring for 30 minutes, which gave an ultrafine deposit of $RuO_2$ on the CdS particles. Then, 3 mg of $H_2PtCl_2$ and 1 ml of an aqueous solution of formaldehyde at 40% were added directly to the sol. After deaeration, the deposition of Pt was effected on a portion of the surface of the CdS particles by photoplatinization, as in the preceding Example, and the excess formaldehyde was expelled under vacuum. The final concentrations were about 40 mg of Pt, 8 mg of $RuO_2$ and 110 mg of CdS per liter of sol.

25 ml of this sol were placed in a "pyrex" glass container provided with optically plane inlet and outlet windows and illuminated at 20° C. by means of an Osram XBO xenon lamp of 450 W. By chromatographic analysis of the evolved gases, a hydrogen production rate of about 50 μl/h was recorded. By repeating the experiment at a temperature of 75° C., a hydrogen production rate of 5 ml/h was recorded, which was one hundred times greater than at 20° C. In both experiments, oxygen was formed in a stoichiometric proportion.

EXAMPLE 4

Conversion of Light Energy Into Electric Energy

A CdS electrode covered by a thin layer of $RuO_2$, prepared according to the method (a) or (b) of Example 1, was immersed in an aqueous solution of KBr at 0.1 M concentration. This solution was within a closed cell, the walls of which were made of Pyrex glass. The oxygen was previously removed by degasing with nitrogen. A second electrode of platinum was also provided. When the CdS electrode was irradiated by a halogen lamp (250 Watt), a photo-voltage of about 900 mV was recorded between both electrodes. The closure of the circuit produced an electric current of about 7 mA through a 100 Ω resistor. This current corresponds to the oxidation of bromine at the photoanode (CdS/$RuO_2$ electrode):

$$Br^- \rightarrow \tfrac{1}{2}Br_2 + e^- \quad (CdS)$$

and the reduction of bromine at the cathode:

$$\tfrac{1}{2}Br_2 + e^- \rightarrow Br^-$$

Therefore, there is no net chemical change in the solution. The light energy is transformed directly into electric energy.

EXAMPLE 5

Photolysis of Water in a Double Compartment Cell by Visible Light

A cell having two compartments, such as the one represented in the drawing, was used. A CdS electrode, provided with a thin layer of $RuO_2$ formed according to the method (a) of Example 1, and a Pt electrode connected by a conductor to the CdS photoanode, were arranged in the cell. A solution of 0.1 M acetic acid and 0.1 M sodium acetate, having a pH of 4.7, was introduced into both compartments of the cell. After degasing with nitrogen, the photoanode was irradiated by means of a 250 W halogen lamp. The light was stripped of UV rays by a cut-off filter, cutting off radiation of wavelengths exceeding 450 nm, and freed from Ir rays by a water filter. The passage of a 400 μA current was recorded in the conductor connecting the photoanode to the cathode and there also was evolution of gas bubbles on both electrodes. By gaseous chromatographic analysis, the gas emitted at the anode was determined to be oxygen and the gas emitted at the cathode was hydrogen, and both of them were formed in a stoichiometric ratio. Furthermore, the quantity of the gas formed was molecularly equivalent to the quantity of electricity which passed between the electrodes according to Faraday's law. During 6 hours of operation, the intensity of the current did not vary, which demonstrates the stability of the CdS electrode.

We claim:

1. Product usable as a photocatalyst, comprising a semi-conductor material in the form of discrete particles or as a layer which comprises part of an electrode, said semi-conductor material being subject to photo-corrosion, characterized in that the surface of the semi-conductor material which is intended to be illuminated is covered with a transparent layer of ruthenium oxide ($RuO_2$), iridium oxide ($IrO_2$), or a mixture of ruthenium oxide ($RuO_2$) and iridium oxide ($IrO_2$), which inhibits the photo-corrosion of the semi-conductor material.

2. Product according to claim 1, characterized in that the semi-conductor material is a material selected from cadmium sulphide (CdS), cadmium selenide (CdS), gallium phosphide (GaP) and silicon (Si).

3. Product according to any one of claims 1 and 2, in the form of discrete particles, characterized in that one surface of the semi-conductor material is deprived of said transparent layer and is covered with a layer of a material having a low overvoltage for the reduction of a cation, of water or $CO_2$.

4. Product according to claim 3, wherein said layer of a material having a low overvoltage is selected from platinum and nickel.

5. Product according to any one of claims 1 and 2, in the form of a layer which comprises part of an electrode, characterized in that the semi-conductor material is deposited in a polycrystalline state on a conductive support in the form of a layer having a surface in contact with the conductive support and an opposite surface in contact with said transparent layer.

6. Product according to claim 5, characterized in that the surface of the conductive support which is not in contact with the semi-conductor material is coated with a layer of a material having a low overvoltage for the reduction of a cation, water or of $CO_2$.

7. Product according to claim 6, wherein said material having a low overvoltage is selected from platinum or nickel.

8. Method for the preparation of a product useful as a photocatalyst, characterized in that a transparent layer of ruthenium oxide ($RuO_2$), iridium oxide ($IrO_2$), or a mixture of ruthenium oxide ($RuO_2$) and iridium oxide ($IrO_2$) is formed on the surface intended to be illuminated of a semi-conductor material subject to photo-corrosion in order to protect the semi-conductor material against photo-corrosion.

9. The process of claim 8, wherein said transparent layer is formed by coating said semi-conductor material with at least one of ruthenium chloride ($RuCl_3$) and iridium chloride ($IrCl_3$) and heating the coated semi-conductor material in the presence of oxygen.

10. Method for producing at least one of electric power and a substance which is chemically transformable with release of energy, said method comprising exposure to electromagnetic radiation of a surface of a semi-conductor material positioned within an electrolyte, said semiconductor material being subject to photocorrosion, said surface being covered with a transparent layer of ruthenium oxide ($RuO_2$), iridium oxide ($IrO_2$), or a mixture thereof, which inhibits the photo-corrosion of said semi-conductor material.

11. Method according to claim 10, characterized in that a fuel is produced.

12. Method according to claim 10 or 9, characterized in that the semiconductor material is in the form of a layer which comprises part of an electrode and in that it is used as anode electrically connected to a separate cathode having a low overvoltage surface for the reduction of a cation, water or $CO_2$, both electrodes being immersed in an aqueous electrolyte.

13. Method according to claim 12, characterized in that the electrodes are arranged on each side of a wall so as to separate the reduced compound, from the oxidized compound.

14. Method according to claim 13, wherein said reduced compound is hydrogen and said oxidized compound is oxygen.

15. Method according to claim 11, characterized in that hydrogen is produced by oxidation-reduction of water or of a hydrohalic acid.

16. Method according to any one of the claims 10 to 15, characterized in that the semiconductor material is used in the form of particles, a mixture of the oxidized compound and of the reduced compound is collected, and in that subsequently both compounds are separated from each other.

17. Method according to claim 16, wherein said oxidized compound is oxygen and said reduced compound is hydrogen.

18. Method according to claim 15, wherein said hydrohalic acid is hydrobromic acid.

19. Method according to claim 11, characterized in that methanol is produced by oxidation-reduction of carbonic acid.

20. Method according to claim 10, characterized in that zinc or lead is produced by oxidation-reduction of a divalent zinc compound or a divalent lead compound, respectively.

21. Method for converting light energy into electric energy, comprising:
providing an anode in which a semi-conductor material is deposited in a polycrystalline state on a conductive support in the form of a layer having a surface in contact with the conductive support and an opposite surface in contact with a transparent layer of ruthenium oxide ($RuO_2$), iridium oxide ($IrO_2$), or a mixture thereof, said semi-conductor material being subject to photo-corrosion and said transparent layer inhibiting said photo-corrosion, and a cathode having a low overvoltage surface for the reduction of a cation, water or $CO_2$, both electrodes being electrically connected together through a useful load and both electrodes being immersed in an aqueous electrolyte comprising a bromine salt; and
illuminating the surface of said semi-conductor material in contact with said transparent layer to oxidize bromine anions to molecular bromine at said anode and reduce molecular bromine to bromine anions at said cathode.

* * * * *